United States Patent
Al-Ofi et al.

(10) Patent No.: US 12,546,911 B2
(45) Date of Patent: Feb. 10, 2026

(54) METHOD AND PROCESS TO OBTAIN RELATIVE PERMEABILITY CURVES FROM DOWNHOLE DATA

(71) Applicant: Baker Hughes Oilfield Operations LLC, Houston, TX (US)

(72) Inventors: Salah Mohammed Al-Ofi, Khobar (SA); Hasan Kesserwan, Khobar (SA); Ahmed Abouzaid, Khobar (SA)

(73) Assignee: Baker Hughes Oilfield Operations LLC, Houston, TX (US)

( * ) Notice: Subject to any disclaimer, the term of this patent is extended or adjusted under 35 U.S.C. 154(b) by 406 days.

(21) Appl. No.: 18/195,840

(22) Filed: May 10, 2023

(65) Prior Publication Data

US 2024/0377552 A1   Nov. 14, 2024

(51) Int. Cl.
*G01V 3/32* (2006.01)
*E21B 49/00* (2006.01)
(Continued)

(52) U.S. Cl.
CPC ............... *G01V 3/32* (2013.01); *E21B 49/00* (2013.01); *G01N 15/088* (2013.01); *G01N 33/24* (2013.01);
(Continued)

(58) Field of Classification Search
CPC ....... G01V 3/32; E21B 49/00; E21B 2200/20; G01N 15/088
See application file for complete search history.

(56) References Cited

U.S. PATENT DOCUMENTS 6,490,531 B1 * 12/2002 Goglin ................. G01N 33/241
702/45
2021/0396904 A1 * 12/2021 Venkataramanan ..... G01V 3/32
(Continued)

OTHER PUBLICATIONS

Al-Ofi, S. , "A New Approach to Estimate Archie Parameters m and n Independently from Dielectric Measurements." Paper presented at the SPWLA 63rd Annual Logging Symposium, Stavanger, Norway, Jun. 2022.
(Continued)

*Primary Examiner* — Ricky Go
(74) *Attorney, Agent, or Firm* — Crowe & Dunlevy, P.C.

(57) ABSTRACT

Disclosed herein is a method for obtaining depth-variant relative permeability and capillary pressure curves utilizes downhole in-situ logging data and formation testing measurements. The method involves obtaining multi-frequency dielectric data and NMR T2 data under residual water and oil saturation conditions, and obtaining formation testing data from which relative permeability and capillary pressure values are determined. Rock properties related to rock texture and fluid distribution are determined from the obtained multi-frequency dielectric and NMR T2 data. Additional NMR T2 and multi-frequency dielectric data are obtained at various saturation conditions and depths, and data sets are formed based on their possession of similar rock properties. A mathematical function is determined, relating water relative permeability, oil relative permeability, and capillary pressure with water saturation, using the rock properties and formed data sets. Finally, continuous depth-variant relative permeability and capillary pressure curves are generated based on the determined mathematical function.

31 Claims, 5 Drawing Sheets

(51) Int. Cl.
*G01N 15/08* (2006.01)
*G01N 33/24* (2006.01)
*G06F 30/20* (2020.01)
*G06F 111/10* (2020.01)

(52) U.S. Cl.
CPC .......... *G06F 30/20* (2020.01); *E21B 2200/20* (2020.05); *G06F 2111/10* (2020.01)

(56) References Cited

U.S. PATENT DOCUMENTS

| | | | |
|---|---|---|---|
| 2023/0152252 A1* | 5/2023 | Kwak | G01V 3/32 324/303 |
| 2023/0243728 A1* | 8/2023 | Gao | G01N 15/08 73/38 |

OTHER PUBLICATIONS

Al-Rushaid, M., et al., "Downhole Estimation of Relative Permeability with Integration of Formation-Tester Measurements and Advanced Well Logs." Paper presented at the SPWLA 58th Annual Logging Symposium, Oklahoma City, Oklahoma, USA, Jun. 2017.

Altunbay, M., "Capillary Pressure Data from NMR Logs and its Implications on Field Economics", Paper presented at the 2001 SPE Annual Technical Conference and Exhibition held in New Orleans, Louisiana, Sep. 20-Oct. 3, 2001.

Archie, G. E., et al., "The Electrical Resistivity Log as an Aid in Determining Some Reservoir Characteristics." AIME Petroleum Tech. (1942), pp. 1-8.

Brooks, R. H., et al., "Properties of Porous Media Affecting Fluid Flow", J. Irrig. Drain. Div., (1966) 92(2):61-88 (Abstract).

Li, Kewen, "Correlation between Resistivity Index, Cappillary Pressure and Relative Permeability", Proceedings of the World Geothermal Congress, Bali, Indonesia, Apr. 25-29, 2010.

Li, B., et al., "NMR Fluid Substitution—A New Method of Reconstructing T2 Distributions Under Primary Drainage and Imbibition Conditions." Petrophysics 62 (2021): pp. 362-378.

Li, Kewen, et al., "A Semianalytical Method to Calculate Relative Permeability From Resistivity Well Logs", Paper presented at the 2005 SPE Annual Technical Conference and Exhibition held in Dallas, Texas, USA, Oct. 9-12, 2005.

Purcell, W. R., "Capillary Pressures—Their Measurement Using Mercury and the Calculation of Permeability", Trans. AIME, (1949), 186, 39.

Toledo, G. T., et al., "Capillary Pressure, Water Relative Permeability, Electrical Conductivity and Capillary Dispersion Coefficient of Fractal Porous Media at Low Wetting Phase Saturation", SPE Advanced Technology Series (SPE-23675), 2(1), pp. 136-141, 1994.

Zhang, T., et al., "Error Quantification of Dielectric Spectroscopy on Carbonate Core Plugs." Paper presented at the SPE/DGS Saudi Arabia Section Technical Symposium and Exhibition, Al-Khobar, Saudi Arabia, May 2011. doi: https://doi.org/10.2118/149053-MS.

* cited by examiner

METHOD AND PROCESS TO OBTAIN RELATIVE PERMEABILITY CURVES FROM DOWNHOLE DATA

TECHNICAL FIELD

This disclosure is directed to the field of formation evaluation, and in particular, to a method for obtaining depth-variant relative permeability and capillary pressure curves from downhole in-situ logging data, along with formation testing measurements.

BACKGROUND

In the oil and gas industry, it is desired to understand the flow mechanism of fluids through porous media in subsurface formations. Two properties of porous media in a subsurface formation that aid this understanding are relative permeability and capillary pressure.

Relative permeability is a measure of the ability of a porous medium in a subsurface formation to transmit a fluid when other fluids are also present. It is a dimensionless parameter that quantifies the ease with which a specific fluid flows through the porous medium in the presence of other fluids and is typically expressed as a function of fluid saturation. The relative permeability of a fluid (e.g., oil, water, or gas) is denoted as $k_r$, and varies between 0 and 1. For each fluid, the relative permeability is a function of its own saturation S and possibly the saturations of other fluids in the system. For example, the relative permeability of oil $k_{ro}$ may be expressed as a function of oil saturation $S_o$, water saturation $S_w$, and/or gas saturation $S_g$.

Relative permeability curves illustrate the relationship between the relative permeability of each fluid phase (e.g., oil, water, or and gas) and their respective saturations in the porous medium, thereby providing valuable information on how the presence and flow of one fluid phase can affect the flow of another fluid phase within the reservoir. In a reservoir, the fluids typically occupy the pore spaces of the rock formation, and their movement depends on factors such as the pressure gradient, viscosity, and relative permeability. Therefore, the determination of the relative permeability curves is of particular interest in multi-phase flow scenarios, such as in reservoirs where oil, water, and/or gas coexist because the incorporation thereof into reservoir modeling, simulation, and analysis allows engineers and geoscientists to determine the efficiency of oil or gas recovery, predict the flow behavior of fluids within the reservoir during production, select and optimize production strategies, and optimize reservoir management.

Capillary pressure is the difference in pressure between two immiscible fluids in a porous medium, such as the pressure difference between water and oil or gas in a reservoir rock. In a porous medium, such as a rock, there are small spaces or pores in which the fluids can exist. The capillary pressure arises due to the different forces acting on the fluids at the interface between the fluids and the porous medium.

Capillary pressure curves describe the relationship between the capillary pressure of a porous medium and the saturation of a non-wetting fluid (such as oil or gas) in the pore spaces and are therefore of particular interest because they may be used to estimate the distribution of fluids in reservoirs and the ability of these fluids to flow through the rock. By measuring the capillary pressure at different saturation levels of the non-wetting fluid, it is possible to determine how easily the fluid will flow through the porous medium. Capillary pressure curves can also be used to estimate other important properties, such as the pore throat size distribution and permeability of the rock, which are utilized in understanding the behavior of fluids in the reservoir and optimizing the production of oil and gas.

Collectively, relative permeability and capillary pressure curves provide a fairly complete picture of the fluid flow behavior in the reservoir. For example, the curves can be used to estimate the critical saturation level at which the relative permeability drops sharply and the capillary pressure increases rapidly. This saturation level is important because it represents the point at which the flow of the non-wetting fluid becomes restricted, and the recovery of the wetting fluid (such as water) becomes more difficult.

Both relative permeability data and capillary pressure data are commonly obtained from laboratory experiments on core samples, which are costly to perform. Therefore, attempts at inferring relative permeability and capillary pressure from indirect measurements, such as downhole logging data, or from each other, have been made.

Prior studies have demonstrated methods for inferring relative permeability from other rock properties, such as capillary pressure (Purcell [1]; Brooks and Corey [2]) and resistivity data (Li [3]). In recent years, efforts have focused on obtaining relative permeability from in-situ conditions downhole data, primarily using resistivity data due to the assumed correlation between electrical and fluid connectivities (Toledo et al. [4]).

In greater detail, the method presented by Li et al. [3] estimated relative permeability from resistivity logs and core analysis. The method was validated with experimental data and showed better prediction of water permeability than oil, but it assumes a water-wet formation and ignores wettability variation across the reservoir. This is an issue because formations can be oil-wet or mixed-wet, and the wettability can vary across the reservoir, affecting the accuracy of the relative permeability estimates. Additionally, the method relies on laboratory measurements, which can be challenging to obtain and may not be representative of the reservoir.

Al-Rushaid et al. [5] demonstrated a method for obtaining relative permeability using NMR and dielectric data from different reservoir sections for saturation determination. However, this method is limited to homogeneous reservoir properties and does not consider different rock facies. This is an issue because reservoirs can be heterogeneous, with variations in lithology and fluid content, which can affect the accuracy of the relative permeability estimates.

Altunbay et al. [6] utilized a method that transforms NMR T2 pore-body distribution to pore-size distribution to extract information about the capillary pressure curve, and then estimates relative permeability curves using Purcell's permeability model. However, this method assumes spherical pore shape and cylindrical pore throats, which are not always applicable, especially in carbonate heterogeneous formations. This is an issue because the assumptions may not hold true for all formations, leading to inaccurate relative permeability estimates. Additionally, the method requires tuning parameters that are calibrated in the laboratory for each formation, which can be time-consuming and expensive.

Finally, Liang et al. [7] proposed a method to estimate relative permeability and capillary pressure curves using joint inversion of array resistivity and formation testing downhole data. This method assumes the formation obeys Archie's law and uses laboratory-derived exponents to calculate saturation endpoints. However, the inversion uses extensive computation for multi-phase flow simulation and ignores diffusion and dispersion transport mechanisms. This is an issue because the assumptions made in the model may not hold true for all formations, and ignoring diffusion and dispersion transport mechanisms can lead to inaccurate estimates of relative permeability and capillary pressure curves. Additionally, the extensive computation utilized for the inversion can be time-consuming and computationally expensive.

Therefore, further development into techniques for determining relative permeability curves that address the drawbacks of the prior art described above is needed.

SUMMARY

Disclosed herein is a method for obtaining depth-variant relative permeability and capillary pressure curves for a subsurface formation. The method includes obtaining multi-frequency dielectric data and NMR T2 data at residual water saturation and residual oil saturation conditions, obtaining formation testing data at residual water saturation and residual oil saturation conditions, and using the obtained formation testing data to determine relative permeability and capillary pressure values at the residual water saturation and residual oil saturation conditions. The method continues with determining rock properties of the subsurface formation related to texture of the rock and distribution of fluids in the rock from the multi-frequency dielectric data, NMR T2 data, and subsurface formation testing data obtained as described above. Additional NMR T2 and multi-frequency dielectric data is obtained at different saturation conditions and depths. Data sets are formed from this additional NMR T2 and multi-frequency dielectric data, with data in each set having similar values for the determined rock properties, and with each set being determined without regard to water saturation or radial depth of investigation. A mathematical function is determined relating water relative permeability, oil relative permeability, and capillary pressure with water saturation, based upon the determined rock properties and the formed data sets. Continuous depth-variant relative permeability and capillary pressure curves are generated based on the determined mathematical function.

The determined rock properties may be textural parameters related to the rock and a value related to a pore size distribution index of the rock, with the textural parameters being a saturation exponent n* that is related to fluids geometrical distribution within the rock and a cementation factor m* that is related to pore shape geometries of the rock. The value related to the pore size distribution index may be a logarithmic mean $T_{2LM}$ of T2 relaxation times from the NMR T2 data obtained at residual water saturation and residual oil saturation conditions.

The different saturation conditions and depths from which the additional multi-frequency dielectric and NMR T2 data are obtained may include at least one saturation condition within a transition zone of the subsurface formation, where a value of total water saturation $S_{wt}$ is greater than a value of residual water saturation $S_{wr}$ but less than a complement of residual oil saturation $S_{or}$, as represented mathematically by: $S_{wr} < S_{wt} < 1-S_{or}$.

The mathematical function may be determined by obtaining results of core analysis, determining Corey's exponent for a wetting phase $n_w$, Corey's exponent for a non-wetting phase $n_o$ as well as to determine a pore size distribution index $\lambda$ from the obtained core analysis results.

The core analysis may be performed by determining textural parameters and a value related to pore size distribution index of multiple core samples, determining relative permeability and capillary pressure of the multiple core samples under different saturation conditions, and deriving Corey's exponent for the wetting phase $n_w$, Corey's exponent for the non-wetting phase $n_o$, and the pore size distribution index $\lambda$ from the determined textural parameters and pore size distribution index and the determined relative permeability and capillary pressure.

Corey's exponents $n_w$, and $n_o$, and the pore size distribution index $\lambda$ may be derived by relating the textural parameters and the value related to the pore size distribution index of the multiple core samples using separate empirical relations for each of Corey's exponents $n_w$, and $n_o$, as well as for the pore size distribution index $\lambda$.

The empirical relation for Corey's exponent for the wetting phase $n_w$ may relate Corey's exponent $n_w$ to a first scalar $\alpha$ and a first function fun1, with the first scalar and the first function being defined by performing curve fitting on the textural parameters and the values related to the pore size distribution index determined from different ones of the multiple core samples. The empirical relation for Corey's exponent for the non-wetting phase $n_o$ may relate Corey's exponent $n_o$ to a second scalar b and a second function fun2, with the second scalar and the second function being defined by performing curve fitting on the textural parameters and the values related to the pore size distribution index determined from different ones of the multiple core samples. The empirical relation for the pore size distribution index $\lambda$ may relate the pore size distribution index $\lambda$ to a third scalar c and a third function fun3, with the third scalar and the third function being defined by performing curve fitting on the textural parameters and the values related to the pore size distribution index determined from different ones of the multiple core samples.

The textural parameters determined of the multiple core samples may be a saturation exponent n*, a cementation factor m*, and the value related to the pore size distribution index as a logarithmic mean $T_{2LM}$ of NMR T2 relaxation times. The empirical relation for Corey's exponent for the wetting phase $n_w$ may be represented mathematically as: $n_o = \alpha \times fun1(n^*, m^*, T_{2LM})$. The empirical relation for Corey's exponent for the non-wetting phase $n_o$ may be represented mathematically as: $n_o = b \times fun2(n^*, m^*, T_{2LM})$. The empirical relation for the pore size distribution index $\lambda$ may be represented mathematically as: $\lambda = c \times fun3(n^*, m^*, T_{2LM})$.

The mathematical function may be further determined by using Corey's exponent for a wetting phase $n_w$, Corey's exponent for a non-wetting phase $n_o$, the pore size distribution index $\lambda$ in a Brooks-Corey model to determine equations for relating water relative permeability $k_{rw}$, oil relative permeability $k_{ro}$, and capillary pressure $p_c$ with water saturation $S_w$.

The Brooks-Corey model may be mathematically represented as:

$$k_{rw}(S_w) = k_{rw}^0 \left(\frac{S_w - S_{wr}}{1 - S_{wr} - S_{or}}\right)^{n_w}$$

$$k_{ro}(S_w) = k_{ro}^0 \left(\frac{1 - S_w - S_{or}}{1 - S_{wr} - S_{or}}\right)^{n_o}$$

$$p_c(S_w) = p_{ce} \left(\frac{S_w - S_{wr}}{1 - S_{wr} - S_{or}}\right)^{-\frac{1}{\lambda}}$$

where:

$k_{rw}^O$ is endpoint relative permeability for the wetting phase;

$k_{ro}^O$ is the endpoint relative permeability for the non-wetting phase;

$p_{ce}$ is capillary entry pressure;

$S_{wr}$ is residual saturation for the wetting phase; and $S_{or}$ is the residual saturation for the non-wetting phase.

$k_{ro}^O$ may be considered to be 1, and the endpoint relative permeability $k_{rw}^O$ and the capillary entry pressure $p_{ce}$ may be determined during the core analysis.

The endpoint relative permeability $k_{rw}^O$ and the capillary entry pressure $p_{ce}$ may be determined during the core analysis, and $k_{ro}^O$ may be determined from a relative permeability of oil at residual water saturation or a relative permeability of oil at residual water level.

The endpoint relative permeability $k_{rw}^O$ may be determined from the relative permeability of water at residual oil saturation or determined from the relative permeability of water at free water level.

The mathematical function may instead be determined by obtaining results of formation testing at depths of two or more entries of one of the formed data sets to thereby determine relative permeability of water $k_{rw}$, relative permeability of oil $k_{ro}$, and capillary pressure $p_c$ at different depths having similar textural parameters, using curve fitting to determine Corey's exponent for a wetting phase $n_w$, Corey's exponent for a non-wetting phase $n_o$, and a pore size distribution index $\lambda$ for the one data set from the relative permeability of water $k_{rw}$, relative permeability of oil $k_{ro}$, and capillary pressure $p_c$, and determining an empirical relation for Corey's exponent for the wetting phase $n_w$ that relates Corey's exponent $n_w$ to a first scalar $\alpha$ and a first function fun1, an empirical relation for Corey's exponent for the non-wetting phase $n_o$ that relates Corey's exponent $n_o$ to a second scalar b and a second function fun2, and an empirical relation for pore size distribution index $\lambda$ that relates the pore size distribution index $\lambda$ to a third scalar c and a third function fun3, with the first scalar $\alpha$, second scalar b, and third scalar c, and the first function fun1, second function fun2, and third function fun3 being determined based upon the Corey's exponents $n_w$ and $n_o$, and the pore size distribution $\lambda$ determined for the one data set along with the formed data sets.

The mathematical function may be further determined by using Corey's exponent for a wetting phase $n_w$, Corey's exponent for a non-wetting phase $n_o$, the pore size distribution index $\lambda$ in a Brooks-Corey model to determine equations for relating water relative permeability $k_{rw}$, oil relative permeability $k_{ro}$, and capillary pressure $p_c$ with water saturation $S_w$. The Brooks-Corey model here may be mathematically represented as:

$$k_{rw}(S_w) = k_{rw}^0 \left( \frac{S_w - S_{wr}}{1 - S_{wr} - S_{or}} \right)^{n_w}$$

$$k_{ro}(S_w) = k_{ro}^0 \left( \frac{1 - S_w - S_{or}}{1 - S_{wr} - S_{or}} \right)^{n_o}$$

$$p_c(S_w) = p_{ce} \left( \frac{S_w - S_{wr}}{1 - S_{wr} - S_{or}} \right)^{-\frac{1}{\lambda}}$$

where:

$k_{rw}^O$ is endpoint relative permeability for the wetting phase;

$k_{ro}^O$ is the endpoint relative permeability for the non-wetting phase;

$p_{ce}$ is capillary entry pressure;

$S_{wr}$ is residual saturation for the wetting phase; and $S_{or}$ is the residual saturation for the non-wetting phase.

$k_{ro}^O$ may be considered to be 1, and the endpoint relative permeability $k_{rw}^O$ and the capillary entry pressure $p_{ce}$ may be determined from core analysis. The endpoint relative permeability $k_{rw}^O$ and the capillary entry pressure $p_{ce}$ may be determined based upon core analysis, and $k_{ro}^O$ may be determined from a relative permeability of oil at residual water saturation or a relative permeability of oil at residual water level. The endpoint relative permeability $k_{rw}^O$ may be determined from the relative permeability of water at residual oil saturation or determined from the relative permeability of water at free water level.

Optionally, the workflow above may be performed by a system for determining depth-variant relative permeability and capillary pressure curves for a subsurface formation, with the system including a microprocessor in cooperation with memory and a communication interface to perform the aforementioned workflow.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Initially, the method (workflow) disclosed herein for obtaining depth-variant relative permeability and capillary pressure curves from downhole in-situ logging data and formation testing measurements will be briefly described. An in-depth discussion of the method will follow, and after that an in-depth discussion of the hardware upon which the method is performed will follow.

A. General Description

The method employs Nuclear Magnetic Resonance (NMR) T2 and multi-frequency dielectric measurements taken from two or more depths of investigation, which are processed to derive pore structure and multi-phase fluid geometrical parameters. These derived parameters are then used in a mathematical model that correlates relative permeability and capillary pressure with water saturation, factoring in the oil and water geometrical distribution within the pore space, to thereby generate continuous relative permeability and capillary pressure curves as a function of water saturation, enabling continuous updating of the curves as new water saturation values are obtained, providing an accurate representation of fluid behavior in the formation as conditions change.

The water saturation values used in the model can be independently obtained from high-frequency dielectric data, regardless of rock and fluid properties. In addition, the method enables the use of different dielectric depths of investigation at similar formation depths to further refine the derived parameters, enhancing accuracy of the mathematical model in generating the curves. Furthermore, core analysis can be incorporated to provide for better calibration and validation of the fluid geometrical parameters derived from the measurements, further enhancing accuracy of the mathematical model in generating the curves.

B. In-Depth Description

Figure 1:
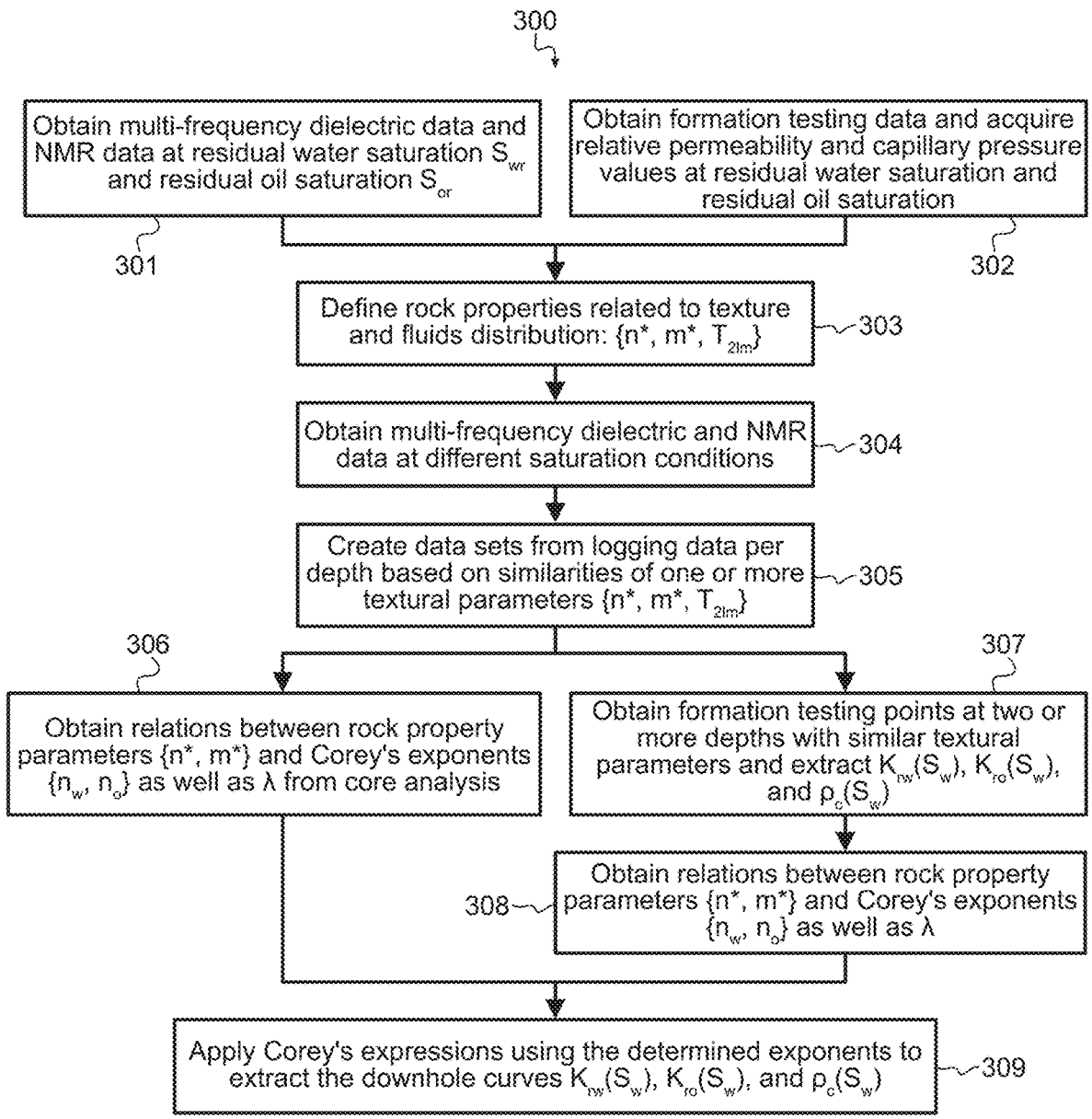
FIG. 1 is a flowchart of steps for performing a method disclosed herein for obtaining depth-variant relative permeability and capillary pressure curves from downhole in-situ logging data and formation testing measurements.

The disclosed method for obtaining depth-variant relative permeability and capillary pressure curves from downhole in-situ logging data and formation testing measurements is now described in detail with reference to flowchart 300 of FIG. 1.

Initially, formation evaluation steps are performed to obtain data to be used in building the mathematical model that correlates relative permeability and capillary pressure with water saturation. Therefore, multi-frequency dielectric data as well as NMR T2 data are obtained from downhole logging tools at specific saturation conditions, namely those of residual water saturation and residual oil saturation (Block 301). This data may be corrected for temperature, and provides information about the fluid distribution and pore structure in the rock formation, as well as the relationship between dielectric data, water saturation, and formation's textural properties, as described by equation (1) below.

The multi-frequency dielectric data obtained from downhole measurements at different saturation conditions can provide information about water saturation through the dipolar polarization effect and the formation's texture through interfacial polarization effects, including water-to-oil interfacial geometry. This can be accomplished using Archie's saturation exponent to relate the dielectric data to water saturation and Archie's cementation exponent to relate the data to pore structure geometry. Several mathematical expressions relate dielectric data with water saturation and formation's textural properties, such as the one presented in Al-ofi [8]. According to this model, the measured dielectric constant of a formation, $\varepsilon_{\mathit{eff}}$, is given by the following equation:

$$\varepsilon_{\mathit{eff}} = \emptyset^{m*}\left[S_w^{n*}\varepsilon_w + \left(1 - S_w^{n*}\right)\varepsilon_{oil} - \varepsilon_{oil}h(s_{\mathit{fluid}})\right] + \left(1 - \emptyset^{m*}\right)\varepsilon_m - \varepsilon_m h(s_m) \quad (1)$$

In this equation:
$\varepsilon_w$ represents the dielectric constant of the water phase.
$\varepsilon_{oil}$ represents the dielectric constant of the oil phase.
$\varepsilon_m$ represents the dielectric constant of the solid matrix.
$S_w$ denotes water saturation.
$\emptyset$ refers to the formation porosity.
m* is the cementation or porosity exponent related to pore shape geometries.
n* is the saturation exponent related to fluid geometrical distribution.
$s_{\mathit{fluid}}$ is the dielectric constant ratio $\varepsilon_{oil}/(\varepsilon_w-\varepsilon_{oil})$.
$s_m$ is the dielectric constant ratio $\varepsilon_m/(\varepsilon_w-\varepsilon_m)$.
h(s) is a mathematical expression for the dielectric constant mixing property, which can be found in Stroud [9].

This equation enables the correlation of multi-frequency dielectric data with water saturation and the formation's textural properties, providing a foundation for building the mathematical model to determine depth-variant relative permeability and capillary pressure curves from downhole in-situ logging data and formation testing measurements.

Together with the collection of multi-frequency dielectric data and NMR T2 data, formation testing data may be obtained, for example by sampling fluid and pressure, and used to determine relative permeability and capillary pressure values at residual water saturation and residual oil saturation conditions (Block 302). This information is used in for calibrating the mathematical model used to generate the curves.

For full understanding, residual water saturation, referred to herein as $S_{wr}$, is the lowest water saturation level in the pore spaces of a rock formation at which water remains immobile and cannot be further reduced by the action of capillary forces, while residual oil saturation, referred herein as $S_{or}$, is the remaining oil saturation level in the pore spaces after the oil has been displaced by water or gas injection, and it can no longer be produced economically. The values for residual water saturation $S_{wr}$ and residual oil saturation $S_{or}$ may be determined according to known methods from Xiao [10] or Birshak [11].

Next, specific rock properties influenced by the texture of the rock and the distribution of fluids in it are determined from the obtained data (Block 303). In greater detail, the NMR T2 and multi-frequency dielectric measurements, including the dielectric constant relationships from equation (1), provide information about the pore structure of the investigated formation interval and the distribution of fluids in that pore structure, which are processed to determine the textural parameters n*, m*, and $T_{2LM}$ related to the pore space. The parameter n* is the saturation exponent related to fluids geometrical distribution while the parameter m* is the cementation factor and related to pore shape geometries. The parameter $T_{2LM}$ is the logarithmic mean of the T2 relaxation times, provides insights into the pore size distribution index $\lambda$.

In determining the textural parameters n* and m* from the dielectric measurements, including the relationships described by equation (1), the method uses the multi-frequency dielectric data at different saturation conditions, along with the NMR T2 data.

NMR T2 and multi-frequency dielectric data are collected at different saturation conditions and depths (Block 304)—this step need not be performed after 303 and may be performed concurrently with the measurements made at 301.

Of the different saturation conditions at which NMR T2 and multi-frequency dielectric data are to be collected, these may include at least one saturation condition within the transition zone where the value of the total water saturation $S_{wt}$ is greater than residual water saturation $S_{wr}$ but less than the complement of residual oil saturation $S_{or}$ (mathematically, this is represented as $S_{wr} < S_{wt} < 1-S_{or}$). At this condition, formation testing may also be performed and the relative permeability of water as a function of total water saturation $k_{rw}(S_{wt})$ and the relative permeability of oil as a function of total water saturation $k_{ro}(S_{wt})$ may be determined from the formation testing data.

The textural parameters determined at 303 are used to form data sets from the data collected at 304—data sets having similar values for the saturation exponent n*, cementation factor m*, and/or logarithmic mean $T_{2LM}$ are formed without regard to water saturation or radial depth of investigation (Block 305).

Ultimately a mathematical function which relates water relative permeability $k_{rw}$, oil relative permeability $k_{ro}$, and capillary pressure $p_c$ with water saturation $S_w$ will be determined and from this the curves will be generated. For example, this may be a modified Brooks-Corey model, such as the one presented in Lake [12], reproduced below.

$$k_{rw}(S_w) = k_{rw}^0 \left( \frac{S_w - S_{wr}}{1 - S_{wr} - S_{or}} \right)^{n_w} \quad (2)$$

$$k_{ro}(S_w) = k_{ro}^0 \left( \frac{1 - S_w - S_{or}}{1 - S_{wr} - S_{or}} \right)^{n_o} \quad (3)$$

$$p_c(S_w) = p_{ce} \left( \frac{S_w - S_{wr}}{1 - S_{wr} - S_{or}} \right)^{-\frac{1}{\lambda}} \quad (4)$$

$k_{rw}^O$ is the endpoint relative permeability for the water phase (or wetting phase in general)—the maximum value of relative permeability water in the porous medium when it is fully saturated with water.

$k_{ro}^O$ is the endpoint relative permeability for the oil phase (or non-wetting phase in general)—the maximum value of relative permeability of oil in the porous medium when it is fully saturated with oil.

$p_{ce}$ is the capillary entry pressure—the minimum pressure difference required for a non-wetting fluid, such as oil or gas, to begin displacing a wetting fluid, such as water, from the pore spaces within a porous medium.

$S_{wr}$ is the residual saturation for water (or wetting phase)—the lowest water saturation level in the pore spaces at which water remains immobile and cannot be further reduced by the action of capillary forces.

$S_{or}$ is the residual saturation for oil (or non-wetting phase)—the remaining oil saturation level in the pore spaces after the oil has been displaced by water or gas injection.

$n_w$ is Corey's exponent for water (or wetting phase).

$n_o$ is Corey's exponent for oil (or non-wetting phase).

$\lambda$ is pore size distribution index (PSDI)—a parameter related to the distribution of pore sizes in the medium.

Use of the modified Brooks-Corey model is not necessary and instead other suitable models known to those of skill in the art may work and are within the scope of this disclosure.

Equations (2-4) can be simplified as in Liang [7] by assuming $k_{ro}^O=1$, representing a normalization of the endpoint relative permeability for the oil phase (non-wetting phase) by the absolute permeability of oil in the rock at residual water saturation.

The endpoint relative permeability $k_{rw}^O$ and the capillary entry pressure $p_{ce}$ can be determined from core analysis, and has been explained above, the residual water saturation $S_{wr}$ and residual oil saturation $S_{or}$ are determined from NMR T2 data.

Figure 2:
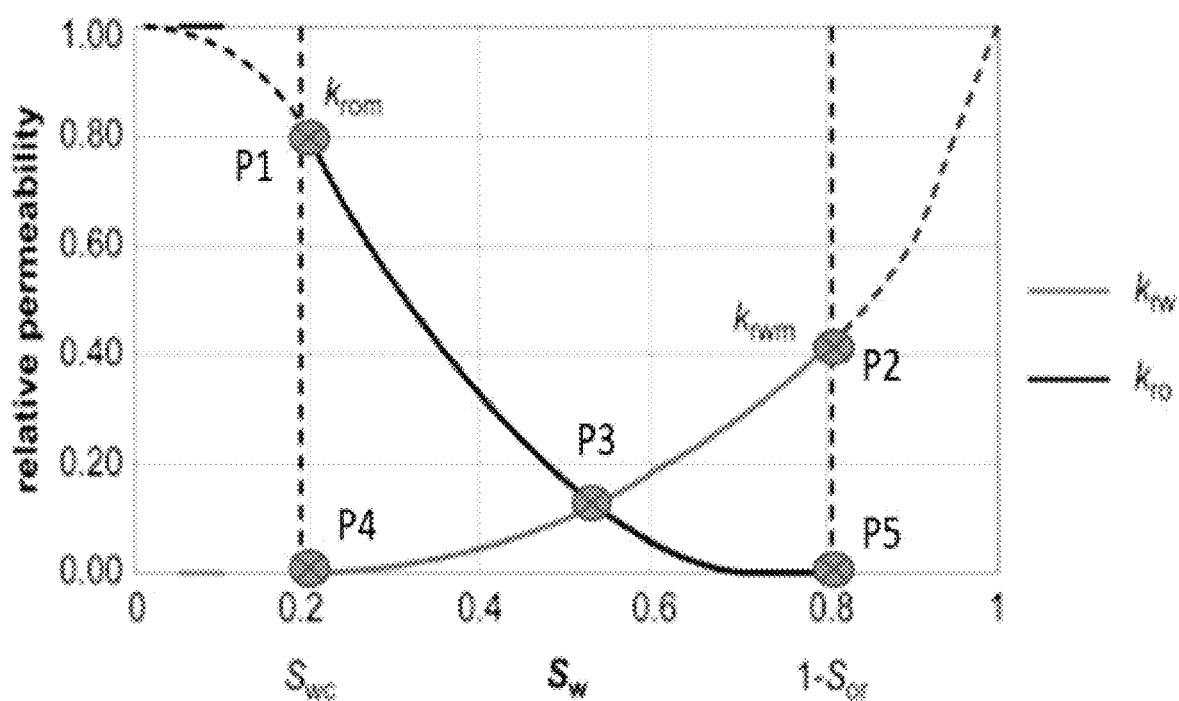
FIG. 2 is a graph illustrating example relative permeability curves and the data points thereon to be determined in order to obtain continuous relative permeability curves utilizing the method disclosed herein.

As an alternative to assuming $k_{ro}^O=1$, the relative permeability of oil $k_{ro}$ (shown as point P1 in FIG. 2) at residual water level (point P4 in FIG. 2) or residual water saturation may be determined as described above, and from this $k_{ro}^O$ may be extracted. As an alternative to using core analysis to determine $k_{rw}^O$, the relative permeability of water $k_{rw}$ (shown as point P2 in FIG. 2) at free water level (point P5 in FIG. 2) or at residual oil saturation may be determined as described above, and from this $k_{rw}^O$ may be determined.

Observe that this leaves Corey's exponents $n_w$ and $n_o$, and the pore size distribution $\lambda$ as values to be determined in order to enable the utilization of the Brooks-Corey model for predicting the relative permeability of water as a function of water saturation $k_{rw}(S_w)$, the relative permeability of oil as a function of water saturation $k_{ro}(S_w)$, and capillary pressure as a function of water saturation $p_c(S_w)$.

This may be performed multiple ways. One way is to use data from core analysis (Block 306). This entails the measurement of the textural parameters n*, m* of the core samples themselves by using dielectric measurements at any saturation condition and the logarithmic mean $T_{2LM}$ from NMR T2, the performance of tests on the core samples to obtain relative permeability and capillary pressure data of the core samples under different saturation conditions, and the use of that laboratory data to derive Corey's exponents $n_w$ and $n_o$, as well as pore size distribution $\lambda$. An empirical relation can be utilized to relate the textural parameters n*, m* and $T_{2LM}$ of different ones of the multiple core samples and the derived Corey's exponents $n_w$ and $n_o$ as well as the pore size distribution $\lambda$ of the core samples, as follows:

$$n_w = a \times fun1(n^*, m^*, T_{2LM}) \quad (5)$$

$$n_o = b \times fun2(n^*, m^*, T_{2LM}) \quad (6)$$

$$\lambda = c \times fun3(n^*, m^*, T_{2LM}) \quad (7)$$

The scalar functions {a, b, c} and functions {fun1, fun2, fun3} of this empirical relation are defined using curve fitting on $n_w$, $n_o$, and $\lambda$ as derived from the core analysis and the textural parameters n*, m* and $T_{2LM}$ derived from the performance of dielectric measurements and NMR T2 on the core samples. This way, Corey's exponents $n_w$ and $n_o$, as well as the pore size distribution index $\lambda$, can be determined based upon the textural parameters n*, m* and $T_{2LM}$ of the formation measured at 303.

Another way to determine Corey's exponents $n_w$ and $n_o$, and the pore size distribution $\lambda$ is to perform formation testing at the depths of two or more entries of one of the multiple data sets determined at 305 (e.g., by performing fluid and pressure sampling at two or more depths having similar textural parameters but different saturation conditions). This would yield the relative permeability of water $k_{rw}$, the relative permeability of water $k_{ro}$, and capillary pressure $p_c$ as being known at different depths having similar textural parameters (Block 307). Therefore, using curve fitting, Corey's exponents $n_w$ and $n_o$, and the pore size distribution $\lambda$ can be determined for that single data set (the data set being, as explained above, based upon similarity of textural parameters). Once the Corey's exponents have been determined therefore, the multiple data sets from 305 and the determined exponents and pore size distribution can be used to determine the scalar functions {a, b, c} and functions {fun1, fun2, fun3}, from which Corey's exponents $n_w$ and $n_o$, as well as the pore size distribution index $\lambda$, may be determined for any values of n*, m* and $T_{2LM}$ (Block 308).

Now with Corey's exponents $n_w$ and $n_o$, as well as the pore size distribution index $\lambda$ being known, Corey's expressions $k_{rw}(S_w)$, $k_{ro}(S_w)$, and $p_c(S_w)$ described above in equations (2), (3), and (4) may therefore be solved for any value of water saturation $S_w$, enabling the generation of continuous relative permeability and capillary pressure curves (Block 309).

Prior art techniques have relied on certain assumptions in determining relative permeability and capillary pressure curves. These assumptions may work well in formation intervals dominated by clastics, where the pore sizes and shapes may be relatively homogenous. However, in formation intervals dominated by carbonates, where the pore sizes and shapes may be more heterogenous, these assumptions may be less accurate. The workflow described above, on the other hand, is particularly useful because it remains accurate even in formation intervals dominated by carbonates, while still being usable and accurate in formation intervals dominated by clastics.

Determining the relative permeability and capillary pressure curves can help operators make more informed decisions about hydrocarbon recovery. This is particularly important when dealing with heterogeneous formations, which can have distinct intervals with different flow behaviors.

Based on the knowledge gained from the curves, operators may change their Enhanced Oil Recovery (EOR) techniques to improve efficiency. For example, if the curves suggest a strong capillary pressure effect, operators might switch from waterflooding to gas injection, which can reduce the impact of capillary pressure and improve oil recovery.

The curves can also help optimize well completion and stimulation techniques. For instance, if the curves reveal specific pore structure and fluid distribution in a given formation interval, operators can tailor hydraulic fracturing treatments to better match the reservoir's characteristics, increasing contact between the wellbore and the reservoir.

Adjusting injection and production rates based on the relative permeability and capillary pressure curves can lead to better reservoir management. If the curves indicate strong interaction between oil and water, operators may modify injection rates to prevent excessive water production or reduce fingering effects.

Well placement and trajectory can also be adjusted based on the information from the curves. If the initial well placement failed to account for unswept oil or bypassed pay zones, operators can use the curves to optimize well placement and maximize reservoir contact and hydrocarbon recovery.

Finally, incorporating the curves into reservoir simulation models can improve predictions of reservoir performance and optimize field development plans. By using the information from the curves, operators can adjust well spacing, EOR techniques, or other aspects of their development strategy to maximize hydrocarbon recovery.

In summary, understanding the relative permeability and capillary pressure characteristics of a reservoir can lead to better decision-making and improved operational efficiency. While the specifics of each reservoir and operation can vary, the general principles outlined above should hold true when using these curves to guide reservoir management decisions.

C. Hardware Description

Now described are NMR and dielectric logging tools such as may be used to make the measurements described above, with it being understood that computing hardware at the surface of a wellsite may be used to perform the workflow described above utilizing the data obtained by the NMR and dielectric logging tools.

NMR logging involves analyzing the response of specific nuclei (e.g., hydrogen) with a characteristic angular momentum (spin) and magnetic moment to applied magnetic fields. In the presence of an externally applied static magnetic field (B0), the nuclear spins become magnetized and align themselves parallel to the B0 field. A radio frequency (RF) pulse train at the Larmor frequency is generated, creating a pulsed RF magnetic field (B1) that interacts with the magnetized nuclei.

The first pulse in the train, referred to as the A pulse, tips or flips the spins of the magnetized nuclei away from the direction of the B0 field and into a plane perpendicular to that of the magnetic field B0. After the A pulse, the nuclei start to relax back to their equilibrium state. The relaxation process is characterized a longitudinal relaxation time (T1) and a transverse relaxation time (T2). T1 corresponds to the time it takes for the nuclei to realign with the B0 field, while T2 refers to the time it takes for the spins to lose coherence in the plane perpendicular to B0 due to magnetic field inhomogeneities and molecular interactions.

Subsequent pulses in the train, referred to as the B pulses, are used to manipulate the spins during the relaxation process. These pulses can either refocus the spins, effectively extending the T2 relaxation time, or further tip the spins, providing additional information on the relaxation process. By analyzing the response of the nuclei to these B pulses, it is possible to obtain more accurate and detailed information about the T1 and T2 relaxation times.

The T1 relaxation time depends on the properties of the fluid, the rock matrix, and the interactions between them. T1 times are longer for more viscous fluids and shorter for less viscous fluids. T2 relaxation times are sensitive to the pore size, fluid type, and the presence of paramagnetic or ferromagnetic materials in the rock matrix. T2 times are longer for larger pore sizes and shorter for smaller pore sizes, and are longer for less viscous fluids (e.g., gas) while being shorter for more viscous fluids (e.g., heavy oil).

Figure 3:
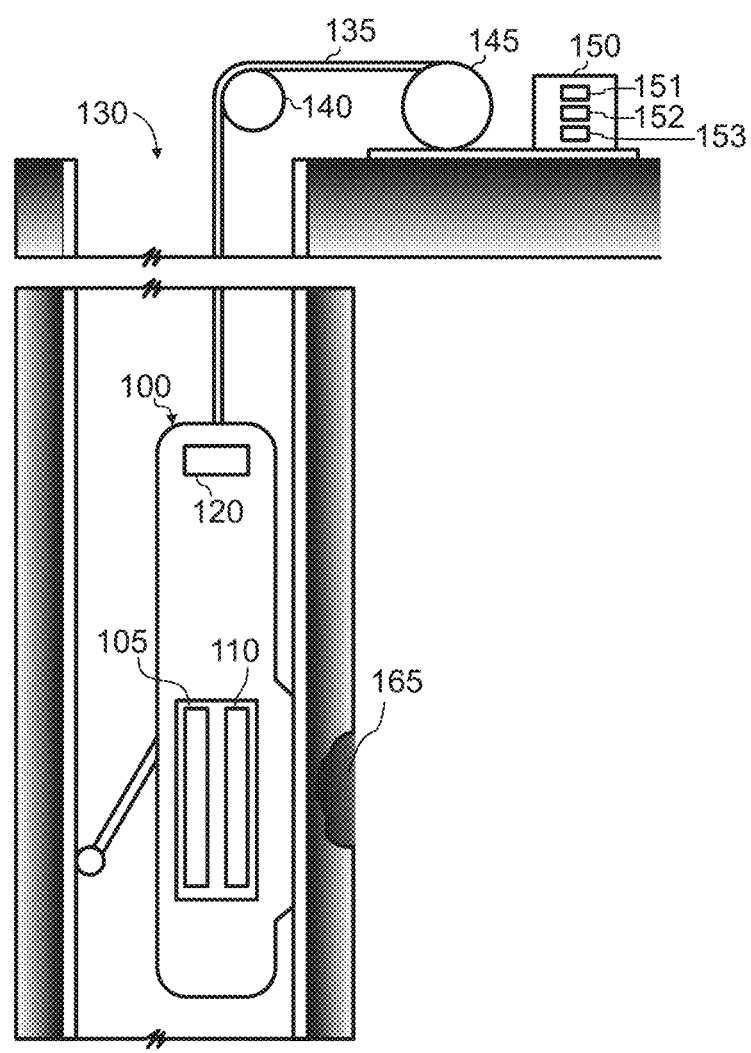
FIG. 3 is an example embodiment of an NMR well logging tool such as may be used to collect NMR data used in performing the method disclosed herein.

Shown in FIG. 3 is an exemplary nuclear magnetic resonance (NMR) well logging apparatus 100. The apparatus 100 is lowered into a borehole 130 by a wireline 135 that extends from the surface. To guide the wireline towards the wireline spool 145 for retrieval, a sheave 140 is used to redirect its path as it exits the borehole. Surface equipment 150 controls the lowering and raising action of the wireline 135.

The NMR well logging apparatus 100 includes a magnetic field generator 105 (e.g., a permanent magnet), an RF coil or antenna system 110, and a processing circuit 120. In operation, the magnetic field generator 105 generates the static magnetic field (B0) that aligns the spins of nuclei within the formation fluids and rock matrix in a subterranean region 165. The RF coil or antenna system 110 generates the radio frequency (RF) magnetic field (B1) by transmitting the RF pulse train (formed by the A and B pulses) at the Larmor frequency. As the nuclei within the formation fluids and rock matrix in the subterranean region 165 respond to the applied magnetic fields, they generate NMR signals. These NMR signals are detected by the same RF coil or antenna system 110. The generation of the magnetic field (B1) by the RF coil or antenna system 110 and the detection of NMR signals are controlled and processed by the processing circuit 120.

The processing circuit 120 determines the T1 and T2 relaxation times by analyzing the detected NMR signals. In particular, the processing circuit 120 processes the NMR signals and extracts the decay profiles, which represent the time dependent decrease in signal amplitude due to relaxation processes. These decay profiles are characterized by the T1 and T2 relaxation times, which, after determination by the processing circuitry 120, are transmitted via the wireline 135 to the surface equipment 150 for the determination of desired properties, alone or in conjunction with the dielectric data, such as the residual water saturation $S_{wr}$ and residual oil saturation $S_{or}$. The surface equipment 150 includes a microprocessor 151 in cooperation with memory 152 and a communication interface 153 to perform the determination of the desired properties, as well as potentially any of the other computing based tasks described herein.

Different designs of NMR tools may be used to perform these measurements. Indeed, any suitable NMR tool may be used, regardless of whether conveyed via the wireline 135 or as part of a drill string.

Figure 4:
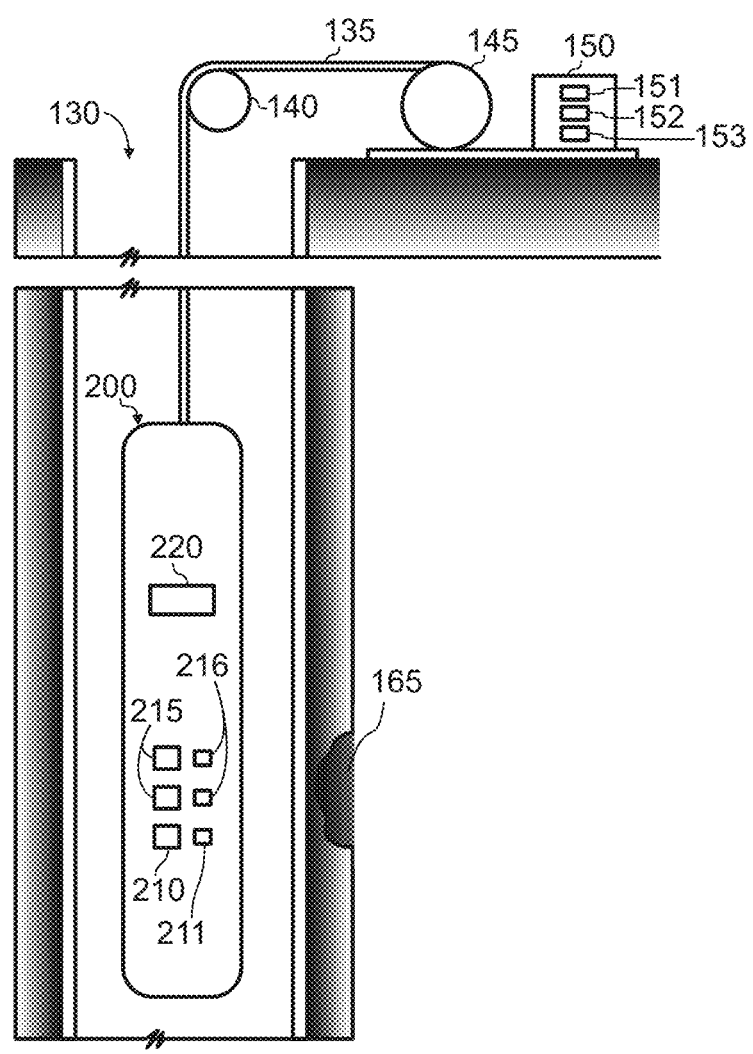
FIG. 4 is a first example embodiment of a multi-frequency dielectric well logging tool such as may be used to collect dielectric data used in performing the method disclosed herein.

Shown in FIG. 4 is a first exemplary multi-frequency dielectric well logging apparatus 200. The apparatus 200 is lowered into a borehole 130 by a wireline 135 that extends from the surface. To guide the wireline towards the wireline spool 145 for retrieval, a sheave 140 is used to redirect its path as it exits the borehole. Surface equipment 150 controls the lowering and raising action of the wireline 135.

The multi-frequency dielectric well logging apparatus 200 includes a transmitter 210, an antenna 211 associated with the transmitter 210, and multiple receivers 215 each having an associated antenna 216 being spaced at a different distance from the antenna 211 of the transmitter 210. The transmitter 210 drives its antenna 211 to generate electromagnetic (EM) waves at multiple frequencies, typically ranging from a few MHz to few GHz, which are directed into the surrounding formation. The choice of frequencies depends on the desired depth of investigation, as lower frequencies penetrate deeper into the formation, while higher frequencies provide higher resolution but shallower measurements. The EM waves propagate through the formation fluids and rock matrix in a subterranean region 165, and as the EM waves travel through the rock matrix and fluids, they experience changes in amplitude and phase due to the formation's dielectric properties. These properties are influenced by factors such as fluid content, rock mineral composition, and pore structure. The dielectric constant (permittivity) and conductivity of the formation affect the velocity and attenuation of the EM waves, respectively. The receivers 215 use their antenna 216 to detect the EM waves as they return. The transmitter 210 and receivers 215 operate under control of the processing circuit 220, which receives the measured data from the receivers 215 and analyzes the amplitude and phase differences between the transmitted and received signals at multiple frequencies. Inversion techniques are used by the processing circuit 220 to estimate the formation's dielectric properties from the measured data. This processed data is then transmitted uphole through the wireline 135 to the surface equipment 150 for further interpretation and determination of desired properties, alone or in conjunction with the NMR T2 data, such as the residual water saturation $S_{wr}$ and residual oil saturation $S_{or}$. The surface equipment 150 includes a microprocessor 151 in cooperation with memory 152 and a communication interface 153 to perform the determination of the desired properties, as well as potentially any of the other computing based tasks described herein.

Figure 5:
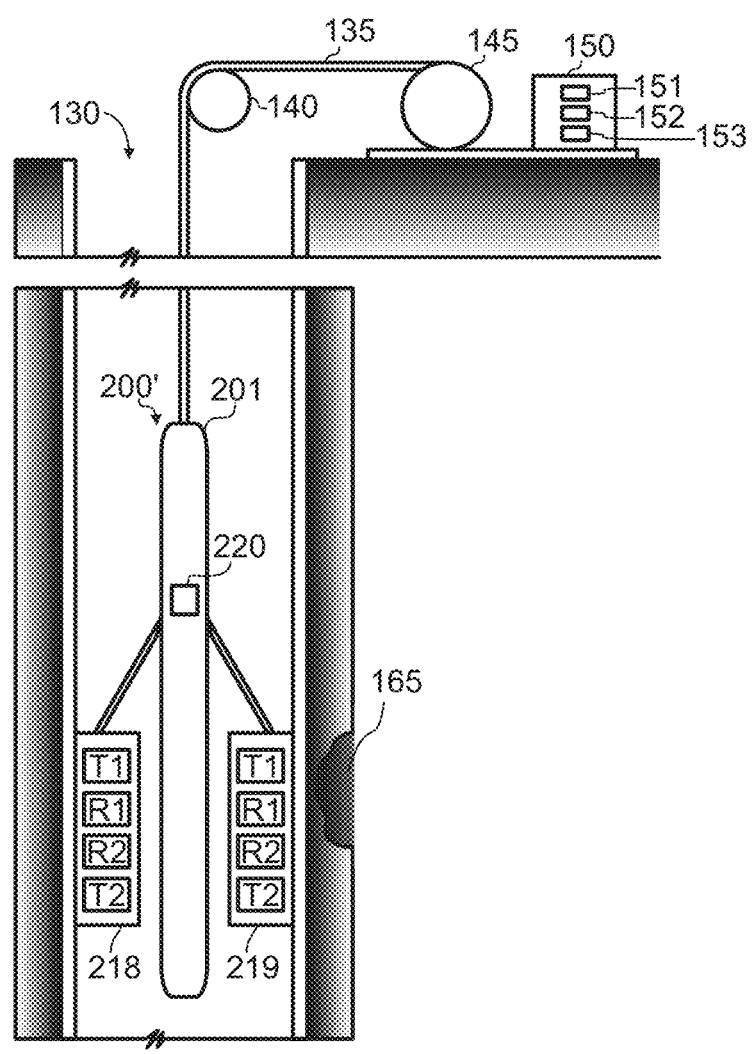
FIG. 5 is a second example embodiment of a multi-frequency dielectric well logging tool such as may be used to collect dielectric data used in performing the method disclosed herein.

Shown in FIG. 5 is a second exemplary multi-frequency dielectric well logging apparatus 200. The apparatus 200 is lowered into a borehole 130 by a wireline 135 that extends from the surface. To guide the wireline towards the wireline spool 145 for retrieval, a sheave 140 is used to redirect its path as it exits the borehole. Surface equipment 150 controls the lowering and raising action of the wireline 135.

The multi-frequency dielectric well logging apparatus 200 includes a main body 201 from which pad extension arms cause first and second pads 218 and 219 to engage the borehole 130 and make electrical contact therewith. Each pad 218 and 219 carries multiple transmitter circuits T1, T2 and multiple receiver circuits R1, R2. Each transmitter circuit T1, T2 has its own antenna or coil associated therewith and each receiver circuit R1, R2 has its own antenna or coil associated therewith.

The transmitters T1, T2 within the pads 218 and 219 drive their antennas to generate electromagnetic (EM) waves at multiple frequencies. These EM waves are transmitted into the formation fluids and rock matrix in a subterranean region 165 by direct contact with the borehole wall, ensuring a strong coupling and accurate measurements. The receivers R1, R2 within the pads 218 and 219 use their antennas to detect the EM waves as they return after interacting with the formation.

The transmitters T1, T2 and receivers R1, R2 within the pads 218 and 219 operate under control of the processing circuit 220, which receives the measured data from the receivers R1, R2 and analyzes the amplitude and phase differences between the transmitted and received signals at multiple frequencies. Inversion techniques are used by the processing circuit 220 to estimate the formation's dielectric properties from the measured data. This processed data is then transmitted uphole through the wireline 135 to the surface equipment 150 for further interpretation and determination of desired properties, alone or in conjunction with the NMR T2 data, such as the residual water saturation $S_{wr}$ and residual oil saturation $S_{or}$. The surface equipment 150 includes a microprocessor 151 in cooperation with memory 152 and a communication interface 15 to perform the determination of the desired properties, as well as potentially any of the other computing based tasks described herein.

Different designs of multi-frequency dielectric tools may be used to perform these measurements. Indeed, any suitable multi-frequency dielectric tool may be used, regardless of whether conveyed via the wireline 135 or as part of a drill string.

D. Citations

[1] Purcell, W. R. "Capillary Pressures—Their Measurement Using Mercury and the Calculation of Permeability", Trans. AIME, (1949), 186, 39.

[2] Brooks, R. H. and Corey, A. T., "Properties of Porous Media Affecting Fluid Flow", J. Irrig. Drain. Div., (1966), 6, pp. 61.

[3] Li, K., "Correlation between Resistivity Index, Capillary Pressure and Relative Permeability", Proceedings of the World Geothermal Congress, Bali, Indonesia, 25-29 Apr. 2010.

[4] Toledo, G. T., Novy, R. A., Davis, H. T. and Scriven, L. E., "Capillary Pressure, Water Relative Permeability, Electrical Conductivity and Capillary Dispersion Coefficient of Fractal Porous Media at Low Wetting Phase Saturation", SPE Advanced Technology Series (SPE-23675), 2(1), pp. 136-141, 1994.

[5] Al-Rushaid, M., Al-Rashidi, H., Ahmad, M., Hadibeik, H., . . . R. Angulo. "Downhole Estimation of Relative Permeability With Integration of Formation-Tester Measurements and Advanced Well Logs." Paper presented at the SPWLA 58th Annual Logging Symposium, Oklahoma City, Oklahoma, USA, June 2017.

[6] Altunbay, M., Martain, R., Robinson, M. "Capillary Pressure Data from NMR Logs and its Implications on Field Economics", Paper presented at the 2001 SPE Annual Technical Conference and Exhibition held in New Orleans, Louisiana, 30 September-3 Oct. 2001.

[7] Liang, L., Zhu, J., Wang, F., Chen, J., Habashy, T. M., and Abubakar, A., 2017. In-situ estimation of relative permeability and capillary pressure from the joint inversion of array resistivity and formation test data. SPE Annual Technical Conference and Exhibition. SPE-187193-MS.

[8] Al-Ofi, S., Ma, S., Kesserwan, H., and Guodong J. "A New Approach to Estimate Archie Parameters m and n Independently from Dielectric Measurements." Paper presented at the SPWLA 63rd Annual Logging Symposium, Stavanger, Norway, June 2022.

[9] Stroud, D., Milton, G. and De, D., 1986. Analytical Model for Dielectric Response of Brine-Saturated Rocks. Physical Review B 34(8), 5145-5153. DOI: 10.1103/PhysRevB.34.5145.

[10] Xiao, L., Mao, Z. Q., Wang, Z. N., and Jin, Y., 2010. Integration of NMR and conventional logs data to enhance the accuracy of porosity calculation in low porosity/low permeability gas reservoirs—A case study of Sichuan basin, China. Paper SPE130615 presented at the SPE Deep Gas Conference and Exhibition.

[11] Birchak, J. R., Gardner, C. G., Hipp, J. E. and Victor, J. M., 1974. High Dielectric Constant Microwave Probes for Sensing Soil Moisture. Proceedings of the IEEE. 93-98.

[12] Liang, L., Zhu, J., Wang, F., Chen, J., Habashy, T. M., and Abubakar, A., 2017. In-situ estimation of relative permeability and capillary pressure from the joint inversion of array resistivity and formation test data. SPE Annual Technical Conference and Exhibition. SPE-187193-MS.

It is evident that modifications and variations can be made to what has been described and illustrated herein without departing from the scope of this disclosure. Additionally, it should be noted that this disclosure aims to include cases where all measurements are made by the executor of the workflow, some measurements are made by the executor of the workflow, or where no measurements are made by the executor of the workflow. In each case, the analysis of this data to derive the curves is conducted by the executor of the workflow. Consequently, each step involving measurements may also be interpreted as obtaining the results of those measurements made by others.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A method for obtaining depth-variant relative permeability and capillary pressure curves for a subsurface formation, the method comprising:
   a) obtaining multi-frequency dielectric data and nuclear magnetic resonance (NMR) T2 data at residual water saturation and residual oil saturation conditions;
   b) obtaining formation testing data at residual water saturation and residual oil saturation conditions and using the obtained formation testing data to determine relative permeability and capillary pressure values at the residual water saturation and residual oil saturation conditions;
   c) determining rock properties of the subsurface formation related to texture of the rock and distribution of fluids in the rock from the multi-frequency dielectric data and NMR T2 data obtained at a) and the subsurface formation testing data obtained at b);
   d) obtaining NMR T2 and multi-frequency dielectric data at different saturation conditions and depths;
   e) forming data sets from the NMR T2 and multi-frequency dielectric data obtained at d), with data in each set having similar values for the rock properties determined at c), and with each set being determined without regard to water saturation or radial depth of investigation;
   f) determining a mathematical function relating water relative permeability, oil relative permeability, and capillary pressure with water saturation, based upon the rock properties determined at c) and data sets formed at e); and
   g) generating continuous depth-variant relative permeability and capillary pressure curves based on the mathematical function determined at f).

2. The method of claim 1, wherein the rock properties determined at c) are textural parameters related to the rock and a value related to a pore size distribution index of the rock, with the textural parameters being a saturation exponent n* that is related to fluids geometrical distribution within the rock and a cementation factor m* that is related to pore shape geometries of the rock; and wherein the value related to the pore size distribution index is a logarithmic mean $T_{2LM}$ of T2 relaxation times from the NMR T2 data obtained at a).

3. The method of claim 1, wherein the different saturation conditions and depths from which the multi-frequency dielectric and NMR T2 data are obtained in d) include at least one saturation condition within a transition zone of the subsurface formation where a value of total water saturation $S_{wt}$ is greater than a value of residual water saturation $S_{wr}$ but less than a complement of residual oil saturation $S_{or}$, as represented mathematically by: $S_{wr} < S_{wt} < 1 - S_{or}$.

4. The method of claim 1, wherein the mathematical function is determined at f) by:
   obtaining results of core analysis and determining Corey's exponent for a wetting phase $n_w$, Corey's exponent for a non-wetting phase $n_o$, and a pore size distribution index $\lambda$ from the obtained core analysis results.

5. The method of claim 4, wherein the core analysis is performed by:
   f1) determining textural parameters and a value related to pore size distribution index of multiple core samples;
   f2) determining relative permeability and capillary pressure of the multiple core samples under different saturation conditions; and
   f3) deriving Corey's exponent for the wetting phase $n_w$, Corey's exponent for the non-wetting phase $n_o$, and the pore size distribution index $\lambda$ from the textural parameters and pore size distribution index determined at f1) and the relative permeability and capillary pressure determined at f2).

6. The method of claim 5, wherein Corey's exponents $n_w$, and $n_o$, and the pore size distribution index $\lambda$ are derived at f3) by:
   relating the textural parameters and the value related to the pore size distribution index of the multiple core samples using separate empirical relations for each of Corey's exponents $n_w$, and $n_o$, as well as for the pore size distribution index $\lambda$.

7. The method of claim 6,
wherein the empirical relation for Corey's exponent for the wetting phase $n_w$ relates Corey's exponent $n_w$ to a first scalar $\alpha$ and a first function fun1, with the first scalar and the first function being defined by performing cure fitting on the textural parameters and the values related to the pore size distribution index determined from different ones of the multiple core samples;
wherein the empirical relation for Corey's exponent for the non-wetting phase $n_o$ relates Corey's exponent $n_o$ to a second scalar b and a second function fun2, with the second scalar and the second function being defined by performing cure fitting on the textural parameters and the values related to the pore size distribution index determined from different ones of the multiple core samples; and
wherein the empirical relation for the pore size distribution index $\lambda$ relates the pore size distribution index $\lambda$ to a third scalar c and a third function fun3, with the third scalar and the third function being defined by performing cure fitting on the textural parameters and the values related to the pore size distribution index determined from different ones of the multiple core samples.

8. The method of claim 7,
wherein the textural parameters determined of the multiple core samples at f1) are a saturation exponent $n^*$, a cementation factor $m^*$, and the value related to the pore size distribution index is a logarithmic mean $T_{2LM}$ of NMR T2 relaxation times;
wherein the empirical relation for Corey's exponent for the wetting phase $n_w$ is represented mathematically as: $n_w = \alpha \times \mathrm{fun1}(n^*, m^*, T_{2LM})$;
wherein the empirical relation for Corey's exponent for the non-wetting phase $n_o$ is represented mathematically as: $n_o = b \times \mathrm{fun2}(n^*, m^*, T_{2LM})$; and
wherein the empirical relation for the pore size distribution index $\lambda$ is represented mathematically as: $\lambda = c \times \mathrm{fun3}(n^*, m^*, T_{2LM})$.

9. The method of claim 7, wherein the mathematical function is further determined at f) by: using Corey's exponent for a wetting phase $n_w$, Corey's exponent for a non-wetting phase $n_o$, the pore size distribution index $\lambda$ in a Brooks-Corey model to determine equations for relating water relative permeability $k_{rw}$, oil relative permeability $k_{ro}$, and capillary pressure $p_c$ with water saturation $S_w$.

10. The method of claim 9, wherein the Brooks-Corey model is mathematically represented as:

$$k_{rw}(S_w) = k_{rw}^0 \left( \frac{S_w - S_{wr}}{1 - S_{wr} - S_{or}} \right)^{n_w}$$

$$k_{ro}(S_w) = k_{ro}^0 \left( \frac{1 - S_w - S_{or}}{1 - S_{wr} - S_{or}} \right)^{n_o}$$

$$p_c(S_w) = p_{ce} \left( \frac{S_w - S_{wr}}{1 - S_{wr} - S_{or}} \right)^{-\frac{1}{\lambda}}$$

where:
$k_{rw}^O$ is endpoint relative permeability for the wetting phase;
$k_{ro}^O$ is the endpoint relative permeability for the non-wetting phase;
$p_{ce}$ is capillary entry pressure;
$S_{wr}$ is residual saturation for the wetting phase; and
$S_{or}$ is the residual saturation for the non-wetting phase.

11. The method of claim 10, where $k_{ro}^O = 1$; and wherein the endpoint relative permeability $k_{rw}^O$ and the capillary entry pressure $p_{ce}$ are determined during the core analysis.

12. The method of claim 10, wherein the endpoint relative permeability $k_{rw}^O$ and the capillary entry pressure $p_{ce}$ are determined during the core analysis; and wherein $k_{ro}^O$ is determined from a relative permeability of oil at residual water saturation or a relative permeability of oil at residual water level determined at b).

13. The method of claim 10, wherein the endpoint relative permeability $k_{rw}^O$ is determined from the relative permeability of water at residual oil saturation determined at b) or determined from the relative permeability of water at free water level.

14. The method of claim 1, wherein the mathematical function is determined at f) by:
f1) obtaining results of formation testing at depths of two or more entries of one of the data sets formed at e) to thereby determine relative permeability of water $k_{rw}$, relative permeability of water $k_{ro}$, and capillary pressure $p_c$ at different depths having similar textural parameters;
f2) using curve fitting to determine Corey's exponent for a wetting phase $n_w$, Corey's exponent for a non-wetting phase $n_o$, and a pore size distribution index $\lambda$ for the one data set from the relative permeability of water $k_{rw}$, relative permeability of water $k_{ro}$, and capillary pressure $p_c$ determined at f1); and
f3) determining an empirical relation for Corey's exponent for the wetting phase $n_w$ that relates Corey's exponent $n_w$ to a first scalar $\alpha$ and a first function fun1, an empirical relation for Corey's exponent for the non-wetting phase $n_o$ that relates Corey's exponent $n_o$ to a second scalar b and a second function fun2, and an empirical relation for pore size distribution index $\lambda$ that relates the pore size distribution index $\lambda$ to a third scalar c and a third function fun3, with the first scalar $\alpha$, second scalar b, and third scalar c, and the first function fun1, second function fun2, and third function fun3 being determined based upon the Corey's exponents $n_w$ and $n_o$, and the pore size distribution $\lambda$ determined for the one data set at f2), along with the data sets formed at e).

15. The method of claim 14, wherein the mathematical function is further determined at f) by: using Corey's exponent for a wetting phase $n_w$, Corey's exponent for a non-wetting phase $n_o$, the pore size distribution index $\lambda$ in a Brooks-Corey model to determine equations for relating water relative permeability $k_{rw}$, oil relative permeability $k_{ro}$, and capillary pressure $p_c$ with water saturation $S_w$.

16. The method of claim 15, wherein the Brooks-Corey model is mathematically represented as:

$$k_{rw}(S_w) = k_{rw}^0 \left( \frac{S_w - S_{wr}}{1 - S_{wr} - S_{or}} \right)^{n_w}$$

$$k_{ro}(S_w) = k_{ro}^0 \left( \frac{1 - S_w - S_{or}}{1 - S_{wr} - S_{or}} \right)^{n_o}$$

$$p_c(S_w) = p_{ce} \left( \frac{S_w - S_{wr}}{1 - S_{wr} - S_{or}} \right)^{-\frac{1}{\lambda}}$$

where:

$k_{rw}^O$ is endpoint relative permeability for the wetting phase;

$k_{ro}^O$ is the endpoint relative permeability for the non-wetting phase;

$p_{ce}$ is capillary entry pressure;

$S_{wr}$ is residual saturation for the wetting phase; and $S_{or}$ is the residual saturation for the non-wetting phase.

17. The method of claim 16, where $k_{ro}^O=1$; and wherein the endpoint relative permeability $k_{rw}^O$ and the capillary entry pressure $p_{ce}$ are determined from core analysis.

18. The method of claim 16, wherein the endpoint relative permeability $k_{rw}^O$ and the capillary entry pressure $p_{ce}$ are determined based upon core analysis; and wherein $k_{ro}^O$ is determined from a relative permeability of oil at residual water saturation or a relative permeability of oil at residual water level determined at b).

19. The method of claim 16, wherein the endpoint relative permeability $k_{rw}^O$ is determined from the relative permeability of water at residual oil saturation determined at b) or determined from the relative permeability of water at free water level.

20. The method of claim 1, further comprising selecting an enhanced-oil- recovery (EOR) technique based on the generated curves and performing the EOR technique at the subsurface formation, the EOR technique being chosen to reduce capillary-pressure effects indicated by the curves.

21. The method of claim 20, wherein selecting the EOR technique comprises choosing gas injection instead of water-flooding when the generated capillary-pressure curve indicates a high capillary entry pressure or strong capillary-pressure gradient.

22. A system for determining depth-variant relative permeability and capillary pressure curves for a subsurface formation, the system comprising a microprocessor in cooperation with memory and a communication interface to perform:
   a) obtaining multi-frequency dielectric data and nuclear magnetic resonance (NMR) T2 data at residual water saturation and residual oil saturation conditions;
   b) obtaining formation testing data at residual water saturation and residual oil saturation conditions and using the obtained formation testing data to determine relative permeability and capillary pressure values at the residual water saturation and residual oil saturation conditions;
   c) determining rock properties of the subsurface formation related to texture of the rock and distribution of fluids in the rock from the multi-frequency dielectric data and NMR T2 data obtained at a) and the subsurface formation testing data obtained at b);
   d) obtaining NMR T2 and multi-frequency dielectric data taken at different saturation conditions and depths;
   e) forming data sets from the NMR T2 and multi-frequency dielectric data obtained at d), with data in each set having similar values for the rock properties determined at d), and with each set being determined without regard to water saturation or radial depth of investigation;
   f) determining a mathematical function relating water relative permeability, oil relative permeability, and capillary pressure with water saturation, based upon the rock properties determined at c) and data sets formed at e); and
   g) generating continuous depth-variant relative permeability and capillary pressure curves based on the mathematical function determined at f).

23. The system of claim 22, wherein the rock properties determined by microprocessor in c) are textural parameters related to the rock and a value related to a pore size distribution index of the rock, with the textural parameters being a saturation exponent n* that is related to fluids geometrical distribution within the rock and a cementation factor m* that is related to pore shape geometries of the rock; and wherein the value related to the pore size distribution index is a logarithmic mean $T_{2LM}$ of T2 relaxation times from the NMR T2 data obtained by the microprocessor in a).

24. The system of claim 22, wherein the different saturation conditions and depths for which the multi-frequency dielectric and NMR T2 data are obtained by the microprocessor in d) include at least one saturation condition within a transition zone of the subsurface formation where a value of total water saturation $S_{wt}$ is greater than a value of residual water saturation $S_{wr}$ but less than a complement of residual oil saturation $S_{or}$, as represented mathematically by: $S_{wr} < S_{wt} < 1 - S_{or}$.

25. The system of claim 22, wherein the mathematical function is determined by the microprocessor in f) by:
   obtaining results of core analysis, determining Corey's exponent for a wetting phase $n_w$, Corey's exponent for a non-wetting phase $n_o$ as well as to determine a pore size distribution index $\lambda$ from the obtained core analysis results.

26. The system of claim 25, wherein the core analysis is performed by:
   f1) determining textural parameters and a value related to pore size distribution index of multiple core samples;
   f2) determining relative permeability and capillary pressure of the multiple core samples under different saturation conditions; and
   f3) deriving Corey's exponent for the wetting phase $n_w$, Corey's exponent for the non-wetting phase $n_o$, and the pore size distribution index $\lambda$ from the textural parameters and pore size distribution index determined at f1) and the relative permeability and capillary pressure determined at f2).

27. The system of claim 26, wherein Corey's exponents $n_w$, and $n_o$, and the pore size distribution index $\lambda$ are derived at f3) by:
   relating the textural parameters and the value related to the pore size distribution index of the multiple core samples using separate empirical relations for each of Corey's exponents $n_w$, and $n_o$, as well as for the pore size distribution index $\lambda$;
   wherein the empirical relation for Corey's exponent for the wetting phase $n_w$ relates Corey's exponent $n_w$ to a first scalar $\alpha$ and a first function fun1, with the first scalar and the first function being defined by performing cure fitting on the textural parameters and the values related to the pore size distribution index determined from different ones of the multiple core samples;
   wherein the empirical relation for Corey's exponent for the non-wetting phase $n_o$ relates Corey's exponent $n_o$ to a second scalar b and a second function fun2, with the second scalar and the second function being defined by performing cure fitting on the textural parameters and the values related to the pore size distribution index determined from different ones of the multiple core samples;
   wherein the empirical relation for the pore size distribution index $\lambda$ relates the pore size distribution index $\lambda$ to a third scalar c and a third function fun3, with the third scalar and the third function being defined by performing cure fitting on the textural parameters and the values related to the pore size distribution index determined from different ones of the multiple core samples;

wherein the textural parameters determined of the multiple core samples at f1) are a saturation exponent n*, a cementation factor m*, and the value related to the pore size distribution index is a logarithmic mean $T_{2LM}$ of NMR T2 relaxation times;

wherein the empirical relation for Corey's exponent for the wetting phase $n_w$ is represented mathematically as: $n_w = \alpha \times \mathrm{fun1}(n^*, m^*, T_{2LM})$;

wherein the empirical relation for Corey's exponent for the non-wetting phase $n_o$ is represented mathematically as: $n_o = b \times \mathrm{fun2}(n^*, m^*, T_{2LM})$; and wherein the empirical relation for the pore size distribution index $\lambda$ is represented mathematically as: $\lambda = c \times \mathrm{fun3}(n^*, m^*, T_{2LM})$.

28. The system of claim 27, wherein the mathematical function is further determined by the microprocessor in f) by: using Corey's exponent for a wetting phase $n_w$, Corey's exponent for a non-wetting phase $n_o$, the pore size distribution index $\lambda$ in a Brooks-Corey model to determine equations for relating water relative permeability $k_{rw}$, oil relative permeability $k_{ro}$, and capillary pressure $p_c$ with water saturation $S_w$; and wherein the Brooks-Corey model is mathematically represented as:

$$k_{rw}(S_w) = k_{rw}^0 \left( \frac{S_w - S_{wr}}{1 - S_{wr} - S_{or}} \right)^{n_w}$$

$$k_{ro}(S_w) = k_{ro}^0 \left( \frac{1 - S_w - S_{or}}{1 - S_{wr} - S_{or}} \right)^{n_o}$$

$$p_c(S_w) = p_{ce} \left( \frac{S_w - S_{wr}}{1 - S_{wr} - S_{or}} \right)^{-\frac{1}{\lambda}}$$

where:

$k_{rw}^O$ is endpoint relative permeability for the wetting phase;

$k_{ro}^O$ is the endpoint relative permeability for the non-wetting phase;

$p_{ce}$ is capillary entry pressure;

$S_{wr}$ is residual saturation for the wetting phase; and $S_{or}$ is the residual saturation for the non-wetting phase.

29. The system of claim 22, wherein the mathematical function is determined by the microprocessor in f) by:

f1) obtaining results of formation testing at depths of two or more entries of one of the data sets formed at e) to thereby determine relative permeability of water $k_{rw}$, relative permeability of water $k_{ro}$, and capillary pressure $p_c$ at different depths having similar textural parameters;

f2) using curve fitting to determine Corey's exponent for a wetting phase $n_w$, Corey's exponent for a non-wetting phase $n_o$, and a pore size distribution index $\lambda$ for the one data set from the relative permeability of water $k_{rw}$, relative permeability of water $k_{ro}$, and capillary pressure $p_c$ determined at f1); and f3) determining an empirical relation for Corey's exponent for the wetting phase $n_w$ that relates Corey's exponent $n_w$ to a first scalar $\alpha$ and a first function fun1, an empirical relation for Corey's exponent for the non-wetting phase $n_o$ that relates Corey's exponent $n_o$ to a second scalar b and a second function fun2, and an empirical relation for pore size distribution index $\lambda$ that relates the pore size distribution index $\lambda$ to a third scalar c and a third function fun3, with the first scalar $\alpha$, second scalar b, and third scalar c, and the first function fun1, second function fun2, and third function fun3 being determined based upon the Corey's exponents $n_w$ and $n_o$, and the pore size distribution/determined for the one data set at f2), along with the data sets formed at e).

30. The system of claim 29, wherein the mathematical function is further determined by the microprocessor in f) by: using Corey's exponent for a wetting phase $n_w$, Corey's exponent for a non-wetting phase $n_o$, the pore size distribution index $\lambda$ in a Brooks-Corey model to determine equations for relating water relative permeability $k_{rw}$, oil relative permeability $k_{ro}$, and capillary pressure $p_c$ with water saturation $S_w$.

31. The system of claim 30, wherein the Brooks-Corey model is mathematically represented as:

$$k_{rw}(S_w) = k_{rw}^0 \left( \frac{S_w - S_{wr}}{1 - S_{wr} - S_{or}} \right)^{n_w}$$

$$k_{ro}(S_w) = k_{ro}^0 \left( \frac{1 - S_w - S_{or}}{1 - S_{wr} - S_{or}} \right)^{n_o}$$

$$p_c(S_w) = p_{ce} \left( \frac{S_w - S_{wr}}{1 - S_{wr} - S_{or}} \right)^{-\frac{1}{\lambda}}$$

where:

$k_{rw}^O$ is endpoint relative permeability for the wetting phase;

$k_{ro}^O$ is the endpoint relative permeability for the non-wetting phase;

$p_{ce}$ is capillary entry pressure;

$S_{wr}$ is residual saturation for the wetting phase; and $S_{or}$ is the residual saturation for the non-wetting phase.

\* \* \* \* \*